(No Model)

L. S. LEFFERTS.
TEA OR COFFEE POT STAND.

No. 582,751. Patented May 18, 1897.

Witnesses.
Albert Popkins
C. P. Jones

Inventor.
Louis S. Lefferts.
By Edgar Tate & Co.
Attorney.

UNITED STATES PATENT OFFICE.

LOUIS S. LEFFERTS, OF BROOKLYN, NEW YORK.

TEA OR COFFEE POT STAND.

SPECIFICATION forming part of Letters Patent No. 582,751, dated May 18, 1897.

Application filed May 11, 1895. Serial No. 549,019. (No model.)

*To all whom it may concern:*

Be it known that I, LOUIS S. LEFFERTS, a citizen of the United States, and a resident of Brooklyn, in the county of Kings and State of New York, have invented certain new and useful Improvements in Tea or Coffee Pot Stands, of which the following is a specification, reference being had to the accompanying drawings, forming a part thereof, in which similar letters of reference indicate corresponding parts.

My invention relates to stands for tea or coffee pots, water-pitchers, and the like, and the object thereof is to construct a stand of this character which is provided with a hinged portion to enable the contents of the urn or pitcher to be more easily discharged; and with this object in view my invention consists, essentially, of the device described in the following specification and illustrated in the accompanying drawings, in which—

Figure 1:
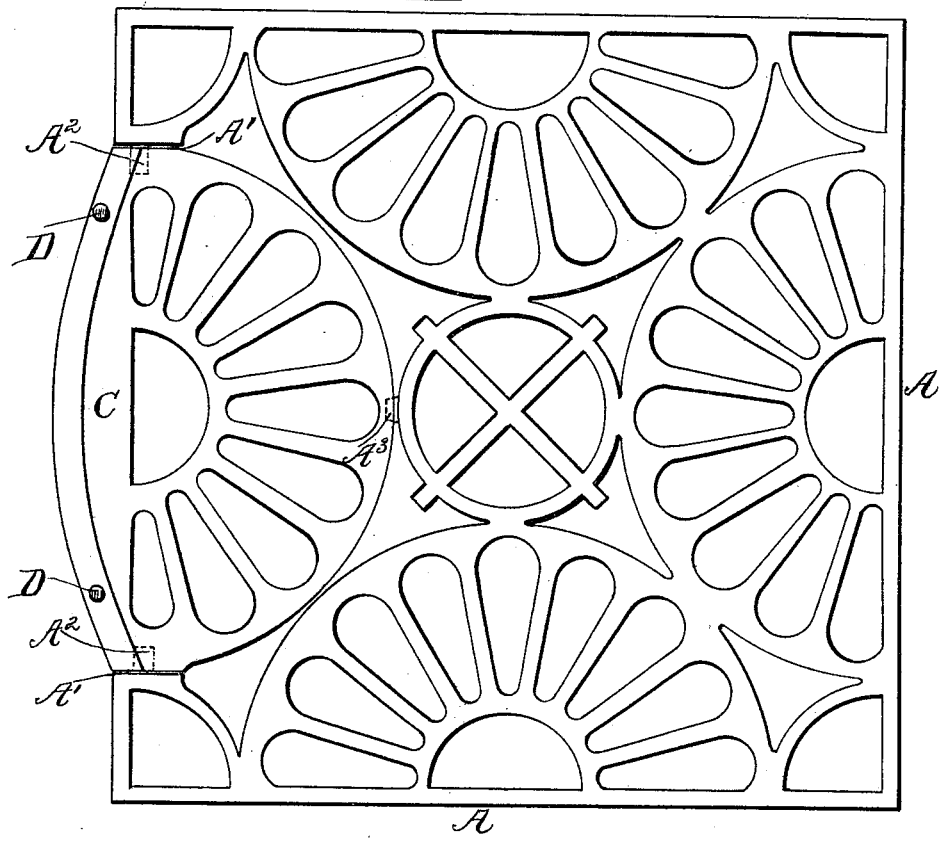
Figure 2:
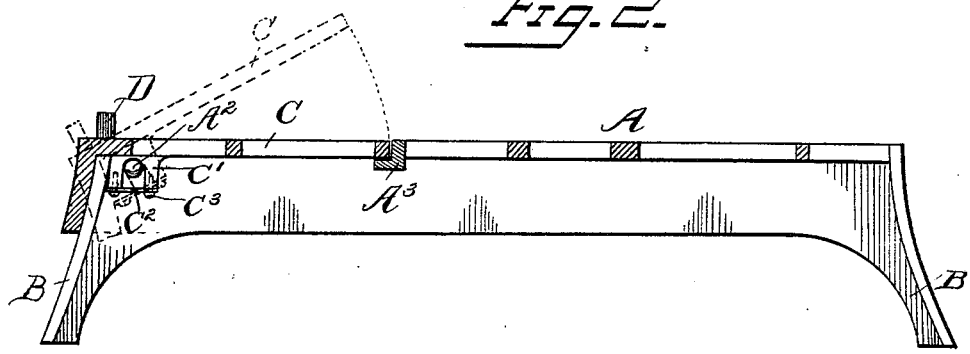

Figure 1 is a plan view of my improved stand, and Fig. 2 is a section of the same.

Similar letters of reference denote like parts throughout both views.

In the practice of my invention I provide a stand or support A, of any suitable material and constructed in any desired manner, having legs or supports B, and preferably provided with a variety of openings or apertures in the top thereof to afford lightness and contribute attractiveness to the same.

The stand A is provided at one side thereof with an open portion A', which is provided upon the outer edge with inwardly-directed lugs $A^2$, and from the inner or central part of said portion projects a shoulder $A^3$, adapted to receive the inner part of the pivoted portion C of the stand.

In one side or portion of the stand A is pivotally secured a segmental section or portion C, which is provided upon the outer edges thereof with the upwardly-extending projections or lugs D, against which the rim or edge of the coffee-pot or pitcher rests during the operation of discharging the contents thereof. Upon the under side of said pivoted portion near the outer edges thereof are formed the depending lugs C', having a strap $C^2$ secured across their ends and held in place through the medium of screws $C^3$, thus forming bearings for the lugs $A^2$ on the frame A.

The operation of the device is as follows: The coffee-pot or pitcher is placed upon the stand with the front portion thereof resting upon the hinged part C of the stand and the edge or rim of the coffee-pot or pitcher resting against the upwardly-projecting lugs C, and when it is desired to discharge the contents of the coffee-pot or pitcher the same is pressed forwardly by means of the handle thereof and is tilted upon said hinged portion C of the stand.

Various changes and modifications can be made in the construction of the device without departing from the spirit and scope of the invention.

Having described my invention, what I claim, and desire to secure by Letters Patent, is—

A coffee-pot stand substantially as herein shown and described, consisting of a main portion A, a segmental portion C, provided with upwardly-directed lugs D, said main portion A being provided with a shoulder $A^3$ to limit the downward movement of the segmental portion, whereby the contents may be discharged from the vessel resting upon the stand without lifting the same therefrom, substantially as shown and described.

LOUIS S. LEFFERTS.

Witnesses:
FRANK RHINEHART,
HERBERT E. WILLIAMS.